(12) United States Patent
Bangad

(10) Patent No.: US 11,055,776 B2
(45) Date of Patent: Jul. 6, 2021

(54) MULTI-DISCIPLINARY COMPREHENSIVE REAL-TIME TRADING SIGNAL WITHIN A DESIGNATED TIME FRAME

(71) Applicant: Bank of America Corporation, Charlotte, NC (US)

(72) Inventor: Sunil R. Bangad, Kendall Park, NJ (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 639 days.

(21) Appl. No.: 15/467,251

(22) Filed: Mar. 23, 2017

(65) Prior Publication Data
US 2018/0276749 A1    Sep. 27, 2018

(51) Int. Cl.
*G06Q 10/06*    (2012.01)
*G06Q 40/04*    (2012.01)

(52) U.S. Cl.
CPC ........... *G06Q 40/04* (2013.01); *G06Q 10/067* (2013.01)

(58) Field of Classification Search
CPC .................................................. G06Q 40/04
See application file for complete search history.

(56) References Cited

U.S. PATENT DOCUMENTS

| | | |
|---|---|---|
| 7,135,701 B2 | 11/2006 | Amin et al. |
| 7,418,283 B2 | 8/2008 | Amin |
| 7,533,068 B2 | 5/2009 | Maassen van den Brink et al. |
| 7,619,437 B2 | 11/2009 | Thom et al. |
| 7,639,035 B2 | 12/2009 | Berkley |
| 7,898,282 B2 | 3/2011 | Harris et al. |
| 8,008,942 B2 | 8/2011 | van den Brink et al. |

(Continued)

FOREIGN PATENT DOCUMENTS

| | | |
|---|---|---|
| AU | 2010249233 A1 | 6/2011 |
| CA | 2886849 A1 | 10/2016 |

(Continued)

OTHER PUBLICATIONS

Eloskkary and Khan, 2017, Financial Portfolio Management using Adibatic Quantum Optimization: The Case of Abu Dhabi Securities Exchange (Year: 2017).*

*Primary Examiner* — Olabode Akintola
*Assistant Examiner* — Brandon M Duck
(74) *Attorney, Agent, or Firm* — Michael A. Springs; Moore & Van Allen PLLC; James C. Edwards

(57) ABSTRACT

A computer system manages a multi-disciplinary comprehensive real-time trading signal within a designated time frame. A classical computer apparatus includes a processor; a memory; and a media management application that is stored in the memory and executable by the processor; a quantum optimizer in operative communication with the classical computer apparatus, where the quantum optimizer includes a quantum processor; and a quantum memory; where the media management application is configured for transmitting historical media information and historical product information to the quantum optimizer; and where the quantum optimizer is configured for receiving the historical media information and historical product information; and analyzing the historical media information and historical product information to determine one or more indicative attributes that may be indicative of product pricing movement.

16 Claims, 8 Drawing Sheets

(56) References Cited

U.S. PATENT DOCUMENTS

| | | |
|---|---|---|
| 8,190,548 B2 | 5/2012 | Choi |
| 8,195,596 B2 | 6/2012 | Rose et al. |
| 8,283,943 B2 | 10/2012 | van den Brink et al. |
| 8,421,053 B2 | 4/2013 | Bunyk et al. |
| 8,744,075 B2 | 6/2014 | Tanaka |
| 8,897,449 B1 | 11/2014 | Broadbent |
| 9,207,672 B2 | 12/2015 | Williams et al. |
| 9,246,675 B2 | 1/2016 | Ding |
| 9,400,499 B2 | 7/2016 | Williams et al. |
| 9,537,660 B2 | 1/2017 | Wang et al. |
| 2004/0139000 A1 | 7/2004 | Amos |
| 2005/0010508 A1 | 1/2005 | Groz |
| 2006/0088157 A1 | 4/2006 | Fujii |
| 2006/0251247 A1 | 11/2006 | Akiyama et al. |
| 2012/0002008 A1 | 1/2012 | Valin et al. |
| 2013/0117200 A1 | 5/2013 | Thom |
| 2014/0297375 A1* | 10/2014 | Richardson ........ G06Q 30/0207 705/14.1 |
| 2015/0206246 A1* | 7/2015 | Lange ................ G06Q 40/06 705/36 R |
| 2017/0126772 A1* | 5/2017 | Campbell ............... G06F 40/18 |
| 2017/0330101 A1* | 11/2017 | Hastings ............... G06N 99/007 |
| 2018/0270271 A1* | 9/2018 | Lee ..................... H04L 63/1466 |

FOREIGN PATENT DOCUMENTS

| | | |
|---|---|---|
| CN | 101834724 A | 9/2010 |
| CN | 101867474 A | 10/2010 |
| CN | 102025491 A | 4/2011 |
| CN | 102664732 A | 9/2012 |
| CN | 103200000 A | 7/2013 |
| CN | 103200001 A | 7/2013 |
| CN | 103312498 A | 9/2013 |
| CN | 103338448 A | 10/2013 |
| CN | 104504601 A | 4/2015 |
| EP | 2462717 A1 | 6/2012 |
| KR | 100563907 B1 | 3/2006 |
| WO | 2010105993 A2 | 9/2010 |
| WO | 2015149035 A1 | 10/2015 |

* cited by examiner

MULTI-DISCIPLINARY COMPREHENSIVE REAL-TIME TRADING SIGNAL WITHIN A DESIGNATED TIME FRAME

FIELD OF THE INVENTION

The present invention embraces a system for managing a multi-disciplinary comprehensive real-time trading signal within a designated time frame and includes a classical computer apparatus and a quantum optimizer in communication with the classical computer apparatus. The quantum optimizer is configured to analyze historical media information to generate a model for identifying potential rating movement. Subsequently, when the classical computer apparatus receives present media, the classical computer apparatus transfers present media attributes to the quantum optimizer. The quantum optimizer analyzes the present media attributes using the model to determine the likelihood a potential rating movement will occur. Based on receiving an indication from the quantum optimizer regarding trade instructions, the classical computer apparatus places a trade or allows an opportunity to pass without placing a trade. By employing a quantum optimizer, instead of a classical computer, to generate the model and/or analyze the present potential ratings movement, the system is able to analyze the present media content in real-time or near real-time.

BACKGROUND

Analyzing media content typically involves processing significant volumes of data. Due to these significant volumes of data, it is often difficult to analyze media content in real-time. As such, a need exists for an improved way of analyzing present media content.

SUMMARY

In one aspect, the present invention embraces a computerized system, and an associated method and computer program product, for managing a multi-disciplinary comprehensive real-time trading signal within a designated time frame.

According to embodiments of the invention, a computer system comprises a classical computer apparatus having a processor; a memory; and a media management application that is stored in the memory and executable by the processor; a quantum optimizer in operative communication with the classical computer apparatus, the quantum optimizer including a quantum processor; and a quantum memory. The media management application is configured for transmitting historical media information and historical product information to the quantum optimizer; where the quantum optimizer is configured for receiving the historical media information and historical product information; and analyzing the historical media information and historical product information to determine one or more indicative attributes that may be indicative of product pricing movement.

In some embodiments, the quantum optimizer is further configured for transmitting the indicative attributes to the classical computer apparatus for comparison to present attributes of present media information for identification of potential product pricing movement.

In some embodiments, the quantum optimizer is configured for determining one or more models for identification of potential product pricing movements based on application of the one or more models to present media information. In some such embodiments, the quantum optimizer is further configured for using the one or more models to determine the indicative attributes. In other such embodiments, the quantum optimizer is further configured for transmitting the one or more models to the classical computer apparatus; wherein the media management application is further configured for receiving the one or more models from the quantum optimizer; and inputting present attributes into the one or more models to identify potential product pricing movement.

In some embodiments, the media management application is further configured for receiving the indicative attributes from the quantum optimizer; and comparing the indicative attributes to present attributes to determine a determined potential product pricing movement. In some such embodiments, the media management application is further configured for transmitting a command configured to cause a product trade corresponding to the determined potential product pricing movement. In some of these embodiments, the media management application is further configured for transmitting a command configured to purchase an amount of the product. In others of these embodiments, the media management application is further configured for transmitting a command configured to sell an amount of the product.

In some embodiments, the media management application is further configured for receiving, from one or more media sources, present attributes; and comparing the indicative attributes to present attributes to identify potential product pricing movement.

In some embodiments, the media management application is further configured for receiving, from one or more media sources, present attributes; and transmitting the present attributes; wherein the quantum computer is configured for receiving the present attributes; comparing the present attributes to the identified attributes to determine a determined potential product pricing movement; and transmitting, to the classical computing apparatus, the determined potential product pricing movement for causing a product trade corresponding to the determined potential product pricing movement. In some embodiments, the media management application is further configured for receiving the determined potential product pricing movement; and transmitting a command configured to cause a product trade corresponding to the determined potential product pricing movement.

In some embodiments, the quantum computer is further configured for analyzing the historical media information and historical product information to generate a model for identification of potential product pricing movements, wherein the model is configured for real-time processing by the classical computer apparatus; wherein the media management application is further configured for receiving one or more present media; identifying present attributes of the one or more present media; analyzing the present attributes using the model to determine (i) whether the media indicates a potential product pricing movement, (ii) a level of potential product pricing movement, and (iii) a confidence corresponding to the level of potential product pricing movement; and based on analyzing the present attributes using the model to determine (i) whether the media indicates a potential product pricing movement, (ii) a level of potential product pricing movement, and (iii) a confidence corresponding to the level of potential product pricing movement, determining a significant product pricing movement is unlikely and thereby allowing an opportunity for trade to pass.

In some embodiments, the quantum computer is further configured for analyzing the historical media information and historical product information to generate a model for identification of potential product pricing movements, wherein the model is configured for real-time processing by the quantum computer; wherein the media management application is further configured for receiving one or more present media; identifying present attributes of the one or more present media; transmitting the present attributes to the quantum computer for processing; wherein the quantum computer is further configured for analyzing the present attributes using the model to determine (i) whether the media indicates a potential product pricing movement, (ii) a level of potential product pricing movement, and (iii) a confidence corresponding to the level of potential product pricing movement; and based on analyzing the present attributes using the model to determine (i) whether the media indicates a potential product pricing movement, (ii) a level of potential product pricing movement, and (iii) a confidence corresponding to the level of potential product pricing movement, determining a significant product pricing movement is unlikely and thereby allowing an opportunity for trade to pass.

In some embodiments, the quantum computer is further configured for analyzing the historical media information and historical product information to generate a first model for identification of potential product pricing movements, wherein the first model is configured for real-time processing by the classical computer apparatus; analyzing the historical media information and historical product information to generate a second model for identification of potential product pricing movements, wherein the second model is configured for real-time processing by the quantum computer; and transmitting the first model to the classical computer apparatus; wherein the media processing application is further configured for receiving one or more present media; identifying present attributes of the present media; analyzing the present attributes using the first model to determine (i) whether the media indicates a potential product pricing movement, (ii) a level of potential product pricing movement, and (iii) a confidence corresponding to the level of potential product pricing movement; and based on analyzing the present attributes using the model to determine (i) whether the media indicates a potential product pricing movement, (ii) a level of potential product pricing movement, and (iii) a confidence corresponding to the level of potential product pricing movement, determining a significant product pricing movement is unlikely and thereby allowing an opportunity for trade to pass, determining that a quantum computing analysis is necessary to achieve a threshold confidence of whether the level of potential product pricing movement is significant; and in response, transmitting the present attributes to the quantum computer for analysis.

In some such embodiments, the quantum computer is further configured for analyzing the present attributes using the second model to determine (i) whether the media indicates a potential product pricing movement, (ii) a level of potential product pricing movement, and (iii) a confidence corresponding to the level of potential product pricing movement; and based on analyzing the present attributes using the model to determine (i) whether the media indicates a potential product pricing movement, (ii) a level of potential product pricing movement, and (iii) a confidence corresponding to the level of potential product pricing movement, transmitting to the classical computer apparatus an indication configured to cause the trade or not to cause the trade. In some of these embodiments, the media management application is further configured for receiving the indication configured to cause the classical computer apparatus to make the trade; and in response to receiving the indication, transmitting a command configured to cause the trade. In other such embodiments, the media management application is further configured for receiving the indication configured to cause the classical computer apparatus not to make the trade; and in response to receiving the indication, allowing an opportunity to make the trade to pass.

According to embodiments of the invention, a computer system for managing a multi-disciplinary comprehensive real-time trading signal within a designated time frame, comprising a classical computer apparatus comprising a processor; a memory; and a media management application that is stored in the memory and executable by the processor; a quantum optimizer in operative communication with the classical computer apparatus, the quantum optimizer comprising a quantum processor; and a quantum memory; wherein the media management application is configured for receiving historical media information and historical product information from one or more media sources; transmitting the historical media information and the historical product information to the quantum optimizer; wherein the quantum optimizer is configured for receiving the historical media information and historical product information; and analyzing the historical media information and historical product information to generate a first model for identification of potential product pricing movements, wherein the first model is configured for real-time processing by the quantum computer; wherein the media management application is further configured for receiving one or more present media from one of the one or more media sources; identifying present attributes of the one or more present media; and transmitting the present attributes to the quantum computer; wherein the quantum computer is further configured for analyzing the present attributes using the first model to determine (i) whether the media indicates a potential product pricing movement, (ii) a level of potential product pricing movement, and (iii) a confidence corresponding to the level of potential product pricing movement; based on analyzing the present attributes using the model to determine (i) whether the media indicates a potential product pricing movement, (ii) a level of potential product pricing movement, and (iii) a confidence corresponding to the level of potential product pricing movement, determining an indication configured to cause the trade or not to cause the trade; and transmitting the indication.

According to embodiments of the invention, a computer system for managing a multi-disciplinary comprehensive real-time trading signal within a designated time frame, comprising a classical computer apparatus comprising a processor; a memory; and a media management application that is stored in the memory and executable by the processor; a quantum optimizer in operative communication with the classical computer apparatus, the quantum optimizer comprising a quantum processor; and a quantum memory; wherein the media management application is configured for receiving historical media information and historical product information from one or more media sources; transmitting the historical media information and the historical product information to the quantum optimizer; receiving the historical media information and historical product information; and analyzing the historical media information and historical product information using a first model to determine (i) whether the media indicates a potential product pricing movement, (ii) a level of potential product pricing movement, and (iii) a confidence corresponding to the level of potential product pricing movement; based on analyzing the present attributes using the model to determine (i)

whether the media indicates a potential product pricing movement, (ii) a level of potential product pricing movement, and (iii) a confidence corresponding to the level of potential product pricing movement, determining an indication configured to cause the trade or not to cause the trade; and transmitting the indication.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
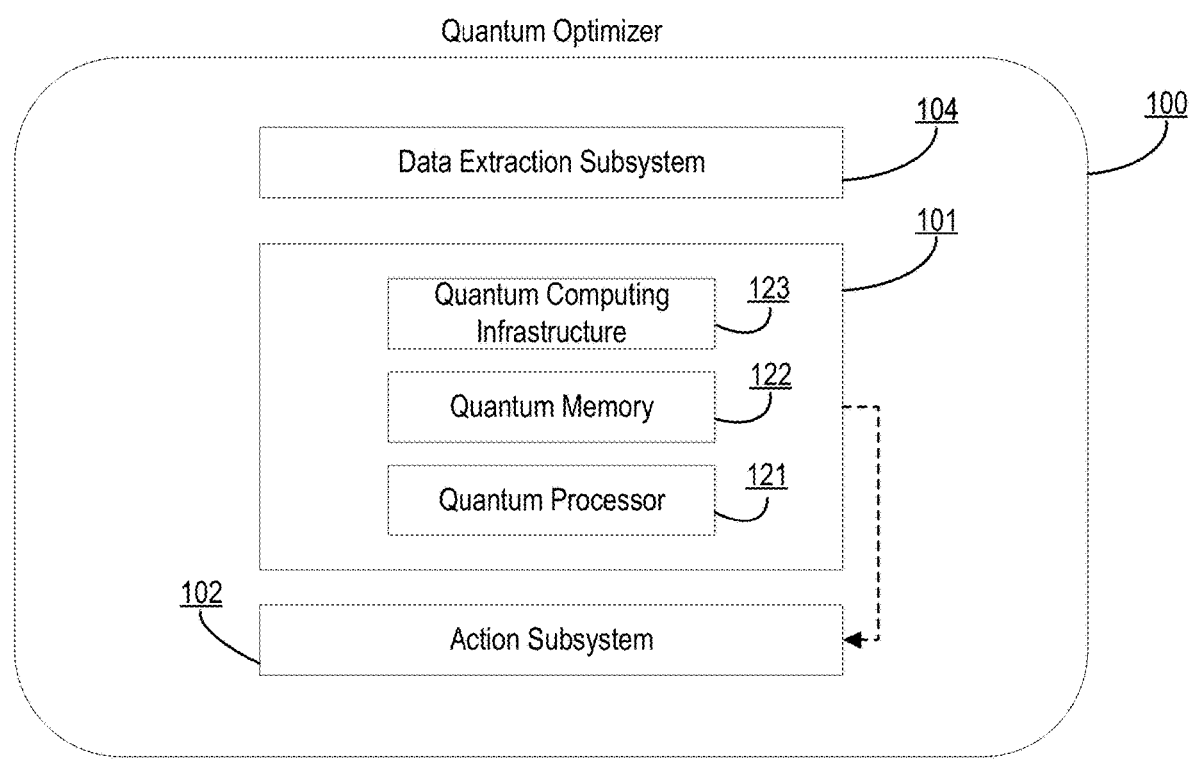
Figure 2:
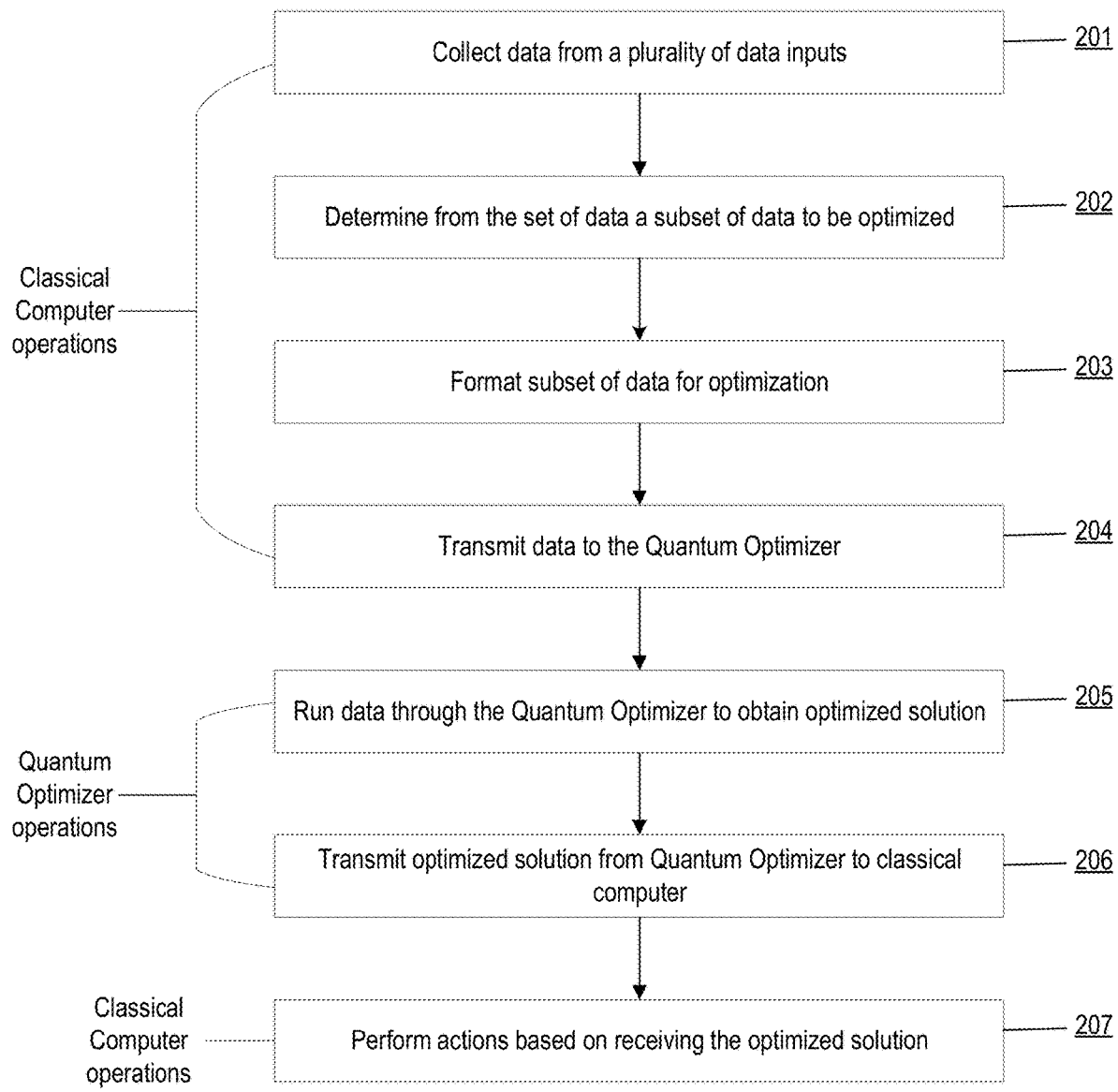
Figure 3:
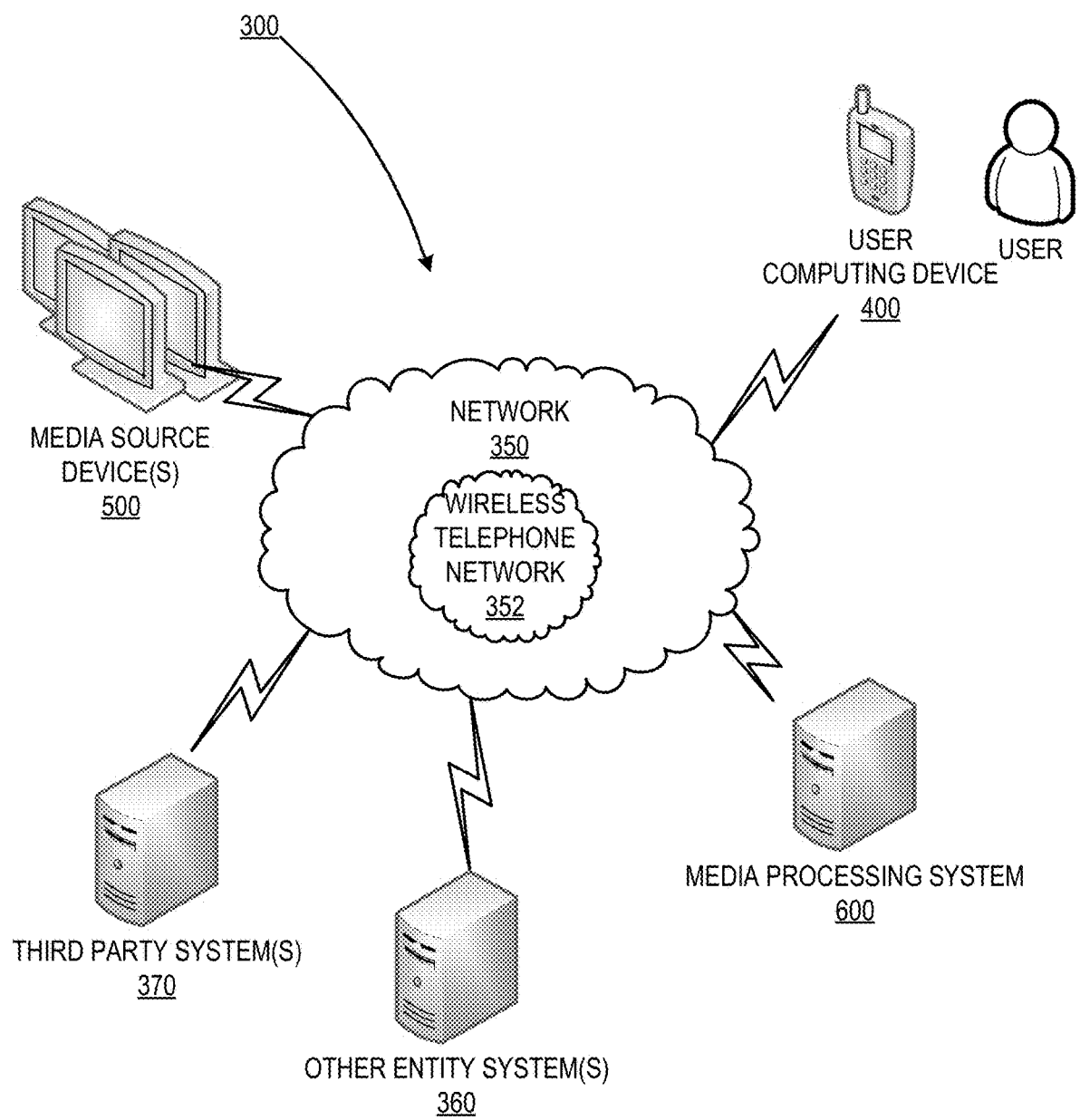
Figure 4:
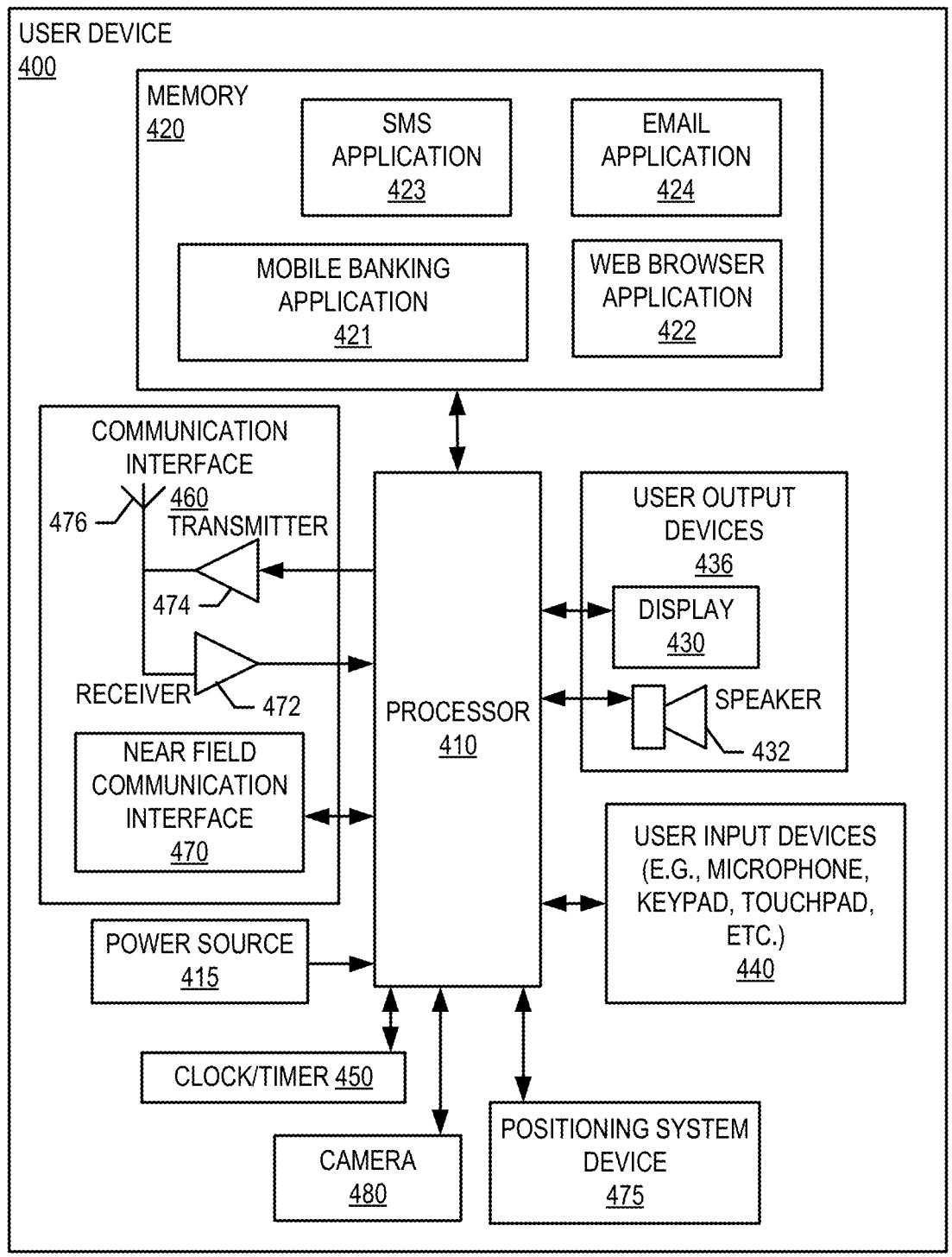
Figure 5:
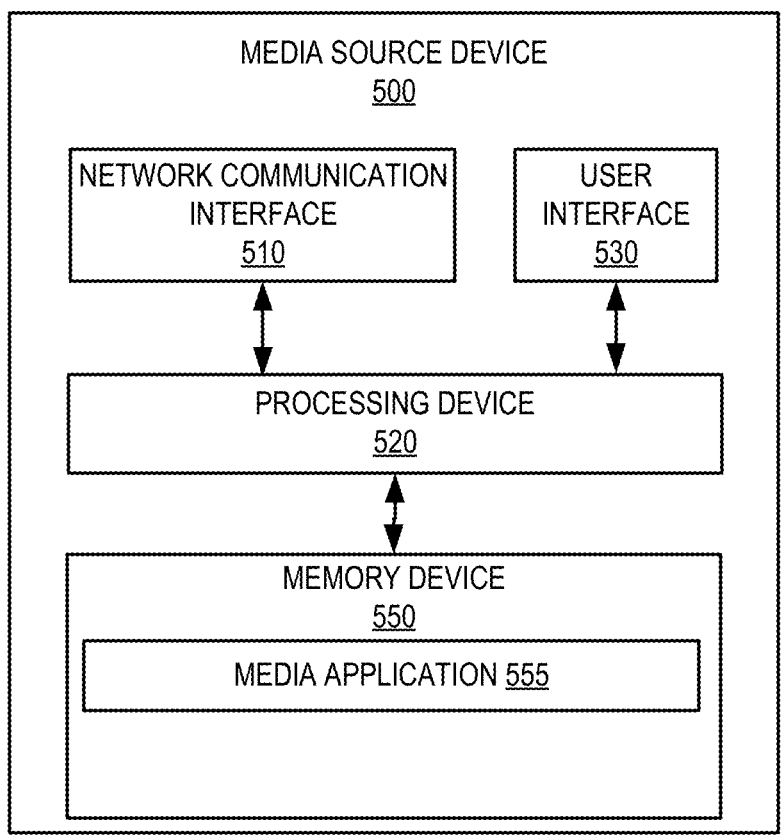
Figure 6:
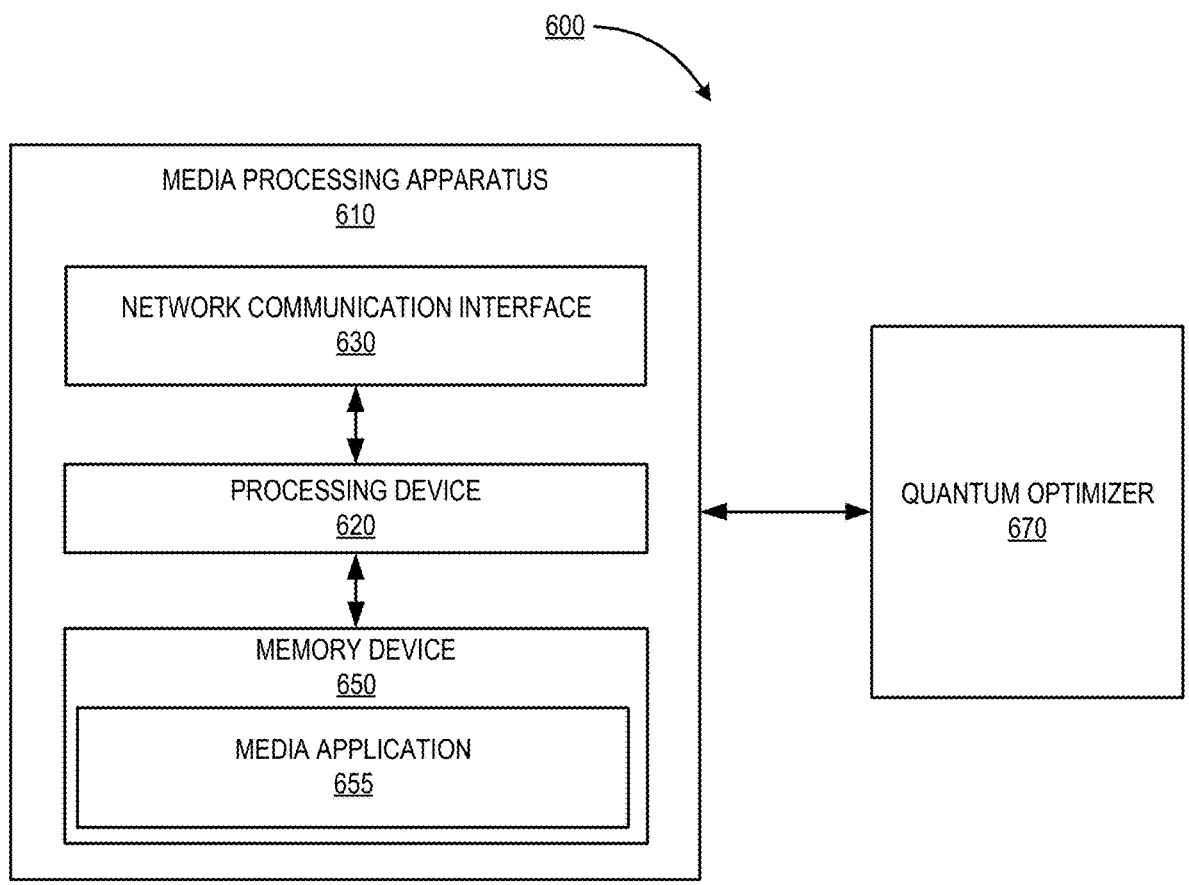
Figure 7A:
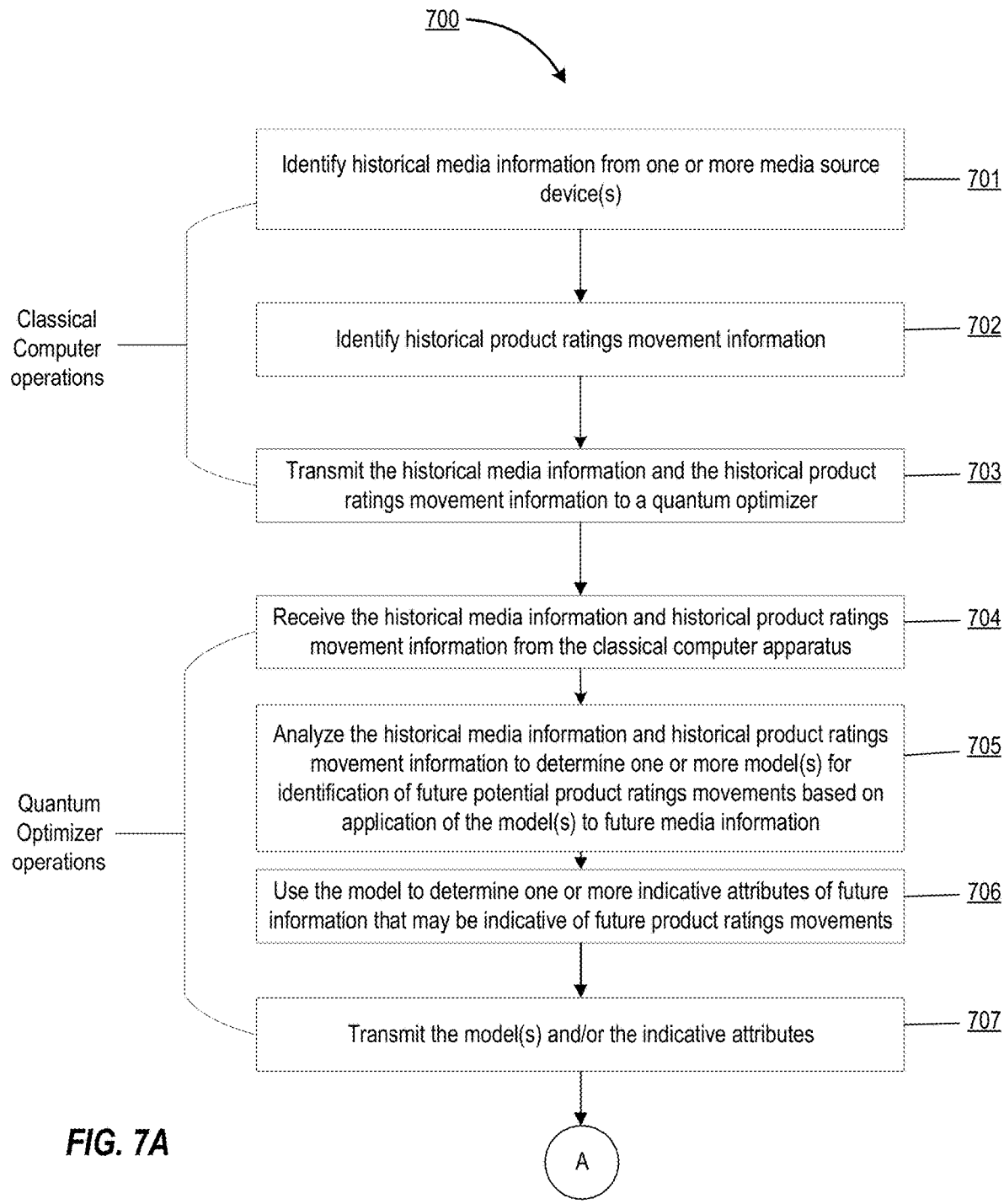
Figure 7B:
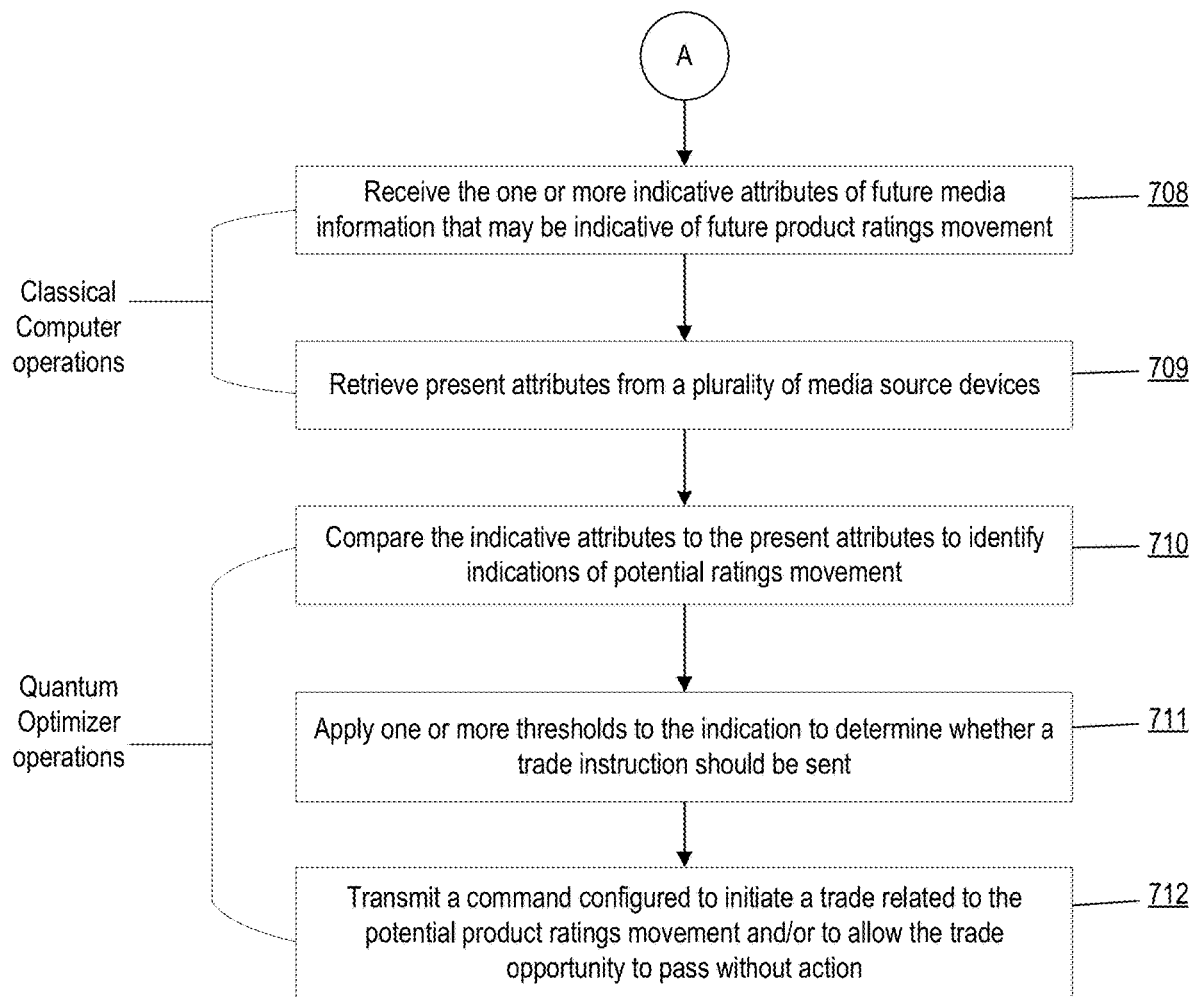

Having thus described embodiments of the invention in general terms, reference will now be made the accompanying drawings, wherein:

FIG. 1 is a schematic diagram of an exemplary quantum optimizer that can be used in parallel with a classical computer to solve optimization problems;

FIG. 2 depicts a method of solving optimization problems by using a classical computer in conjunction with a quantum optimizer;

FIG. 3 depicts an operating environment in accordance with an aspect of the present invention;

FIG. 4 schematically depicts a user device in accordance with an aspect of the present invention;

FIG. 5 schematically depicts a media source device in accordance with an aspect of the present invention;

FIG. 6 schematically depicts a media processing system in accordance with an aspect of the present invention FIGS. 7A-7B depict a method for analyzing media information to indicate a trade in accordance with an aspect of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Embodiments of the invention represent an improvement in technology by analyzing media information (e.g., that correlates to current events and/or entity publications) using a quantum optimizer in order to provide a real-time determination of whether to indicate a trade. Moreover, by initially evaluating media information using a model that may be processed in real-time or near real-time by a classical computer, and then evaluating certain media information using a model that may be processed in real-time by a quantum optimizer if the confidence level provided by the classical-computer model is not high, analyzing media information for trade indications may be performed in real-time, while minimizing the usage of the quantum optimizer.

As discussed above, embodiments of the present invention embrace a system for analyzing media information in real-time to indicate trades and includes a classical computer apparatus and a quantum optimizer in communication with the classical computer apparatus. The quantum optimizer is configured to analyze media information to generate a model for analyzing media to indicate a likelihood of a potential ratings movements. Subsequently, when the classic the media information to the quantum optimizer. The quantum optimizer analyzes the media information using the model to determine whether the media information indicates a potential ratings movement. Based on receiving an indication from the quantum optimizer of whether the media indicates a potential ratings movement, the classical computer apparatus may initiate a trade based on the indication or allow the opportunity to initiate the trade to pass. By employing a quantum optimizer, instead of a classical computer, to analyze the media information, the system is able to analyze the media information in real-time or near real-time.

In some embodiments, the invention may also solve the problem of how to leverage huge amounts of data from key network devices in order to identity a potential movement in ratings while also preventing any type of attack such as an intrusion between devices networked in the system. As discussed above, a quantum optimizer generates one or more models based on data collected from key network devices. Then, when a media instance occurs or is expected to occur, the quantum optimizer applies the one or more models to the circumstances of the media. Thus, the system may identify what to analyze in greater detail, what media information and/or systems to mitigate (i.e., cut off from communication) due to a potential exposure such as an intrusion of communication between networked devices, and of course, when a potential ratings movement may occur.

As used herein, a quantum computer is any computer that utilizes the principles of quantum physics to perform computational operations. Several variations of quantum computer design are known, including photonic quantum computing, superconducting quantum computing, nuclear magnetic resonance quantum computing, and/or ion-trap quantum computing. Regardless of the particular type of quantum computer implementation, all quantum computers encode data onto qubits. Whereas classical computers encode bits into ones and zeros, quantum computers encode data by placing a qubit into one of two identifiable quantum states. Unlike conventional bits, however, qubits exhibit quantum behavior, allowing the quantum computer to process a vast number of calculations simultaneously.

A qubit can be formed by any two-state quantum mechanical system. For example, in some embodiments, a qubit may be the polarization of a single photon or the spin of an electron. Qubits are subject to quantum phenomena that cause them to behave much differently than classical bits. Quantum phenomena include superposition, entanglement, tunneling, superconductivity, and the like.

Two quantum phenomena are especially important to the behavior of qubits in a quantum computer: superposition and entanglement. Superposition refers to the ability of a quantum particle to be in multiple states at the same time. Entanglement refers to the correlation between two quantum particles that forces the particles to behave in the same way even if they are separated by great distances. Together, these two principles allow a quantum computer to process a vast number of calculations simultaneously.

In a quantum computer with n qubits, the quantum computer can be in a superposition of up to 2n states simultaneously. By comparison, a classical computer can only be in one of the 2n states at a single time. As such, a quantum computer can perform vastly more calculations in a given time period than its classical counterpart. For example, a quantum computer with two qubits can store the information of four classical bits. This is because the two qubits will be a superposition of all four possible combinations of two classical bits (00, 01, 10, or 11). Similarly, a three qubit system can store the information of eight classical bits, four qubits can store the information of sixteen classical bits, and so on. A quantum computer with three hundred qubits could possess the processing power equivalent to the number of atoms in the known universe.

Despite the seemingly limitless possibilities of quantum computers, present quantum computers are not yet substitutes for general purpose computers. Instead, quantum computers can outperform classical computers in a specialized set of computational problems. Principally, quantum computers have demonstrated superiority in solving optimization problems. Generally speaking, the term "optimization problem" as used throughout this application describe a problem of finding the best solution from a set of all feasible solutions. In accordance with some embodiments of the present invention, quantum computers as described herein are designed to perform adiabatic quantum computation and/or quantum annealing. Quantum computers designed to perform adiabatic quantum computation and/or quantum annealing are able to solve optimization problems as contemplated herein in real time or near real time.

Embodiments of the present invention make use of quantum ability of optimization by utilizing a quantum computer in conjunction with a classical computer. Such a configuration enables the present invention to take advantage of quantum speedup in solving optimization problems, while avoiding the drawbacks and difficulty of implementing quantum computing to perform non-optimization calculations. Examples of quantum computers that can be used to solve optimization problems parallel to a classic system are described in, for example, U.S. Pat. Nos. 9,400,499, 9,207,672, each of which is incorporated herein by reference in its entirety.

FIG. 1 is a schematic diagram of an exemplary Quantum Optimizer 100 that can be used in parallel with a classical computer to solve optimization problems. The Quantum Optimizer 100 typically includes a Data Extraction Subsystem 104, a Quantum Computing Subsystem 101, and an Action Subsystem 105. As used herein, the term "subsystem" generally refers to components, modules, hardware, software, communication links, and the like of particular components of the system. Subsystems as contemplated in embodiments of the present invention are configured to perform tasks within the system as a whole.

As depicted in FIG. 1, the Data Extraction Subsystem 104 communicates with the network to extract data for optimization. It will be understood that any method of communication between the Data Extraction Subsystem 104 and the network is sufficient, including but not limited to wired communication, Radiofrequency (RF) communication, Bluetooth®, WiFi, and the like. The Data Extraction Subsystem 104 then formats the data for optimization in the Quantum Computing Subsystem.

As further depicted in FIG. 1, the Quantum Computing Subsystem 101 includes a Quantum Computing Infrastructure 123, a Quantum Memory 122, and a Quantum Processor 121. The Quantum Computing Infrastructure 123 includes physical components for housing the Quantum Processor 121 and the Quantum Memory 122. The Quantum Computer Infrastructure 123 further includes a cryogenic refrigeration system to keep the Quantum Computing Subsystem 101 at the desired operating temperatures. In general, the Quantum Processor 121 is designed to perform adiabatic quantum computation and/or quantum annealing to optimize data received from the Data Extraction Subsystem 104. The Quantum Memory 122 typically includes a plurality of qubits used for storing data during operation of the Quantum Computing Subsystem 101. In general, qubits are any two-state quantum mechanical system. It will be understood that the Quantum Memory 122 may include any such two-state quantum mechanical system, such as the polarization of a single photon, the spin of an electron, and the like.

The Action Subsystem 102 communicates the optimized data from the Quantum Computing Subsystem 101 over the network. It will be understood that any method of communication between the Data Extraction Subsystem 104 and the network is sufficient, including but not limited to wired communication, Radiofrequency (RF) communication, Bluetooth®, WiFi, and the like.

FIG. 2 depicts a method 200 of solving optimization problems by using a classical computer in conjunction with a quantum optimizer. As depicted in FIG. 2, a classical computer begins the method at step 201 by collecting data from a plurality of inputs. At step 202, the classical computer then determines from the set of data collected at step 201 a subset a data to be optimized. The classical computer then formats the subset of data for optimization at step 203. At step 204, the classical computer transmits the formatted subset of data to the Quantum Optimizer. The Quantum Optimizer runs the data to obtain the optimized solution at 205. The Quantum Optimizer then transmits the optimized data back to the classical computer at step 206. Finally, the classical computer can perform actions based on receiving the optimized solution at step 207.

In one aspect, the present invention embraces a method of managing a multi-disciplinary comprehensive real-time trading signal within a designated time frame (e.g., to indicate a trade should be made or avoided, as further described below) in real-time.

An entity that analyzes data for potential trade opportunities typically analyzes various aspects of potential ratings (or, "pricing") movement of a product such as an equity, security, bond, stock, or the like, once the entity receives media information. The potential pricing movement may be indicated by data that is, includes or is related to data inputs that are present prior to the media distribution, present during media distribution, and/or present after media distribution. Such data may be collected and analyzed to formulate one or more models for real-time analysis of present media information to identify indications of pricing movements as discussed further below.

The present invention embraces a system for managing a multi-disciplinary comprehensive real-time trading signal within a designated time frame and includes a classical computer apparatus and a quantum optimizer in communication with the classical computer apparatus. The quantum optimizer is configured to analyze historical media information to generate a model for identifying potential rating movement. Subsequently, when the classical computer apparatus receives present media, the classical computer apparatus transfers present media attributes to the quantum optimizer. The quantum optimizer analyzes the present media attributes using the model to determine the likelihood a potential rating movement will occur. Based on receiving an indication from the quantum optimizer regarding trade instructions, the classical computer apparatus places a trade or allows an opportunity to pass without placing a trade. By employing a quantum optimizer, instead of a classical computer, to generate the model and/or analyze the present potential ratings movement, the system is able to analyze the present media content in real-time or near real-time.

In this regard, analyzing media information to indicate trends typically involves processing significant volumes of data. This volume of data is particularly significant for broad (unfocused or unfiltered) media analysis (e.g., when many media information source systems are used with little or no pre-processing or filtering). Due to these significant volumes of data, certain media analyses are typically not verified in real-time by existing solutions.

As noted, however, the present invention embraces a method of analyzing media information in real-time. In this regard, a quantum optimizer, instead of a classical computer, is typically employed to analyze media information in order to make an educated trade decision. In particular, a quantum optimizer may initially analyze information regarding previous media information to generate a model that may be used for analyzing present or future media information for potential trade indications. Thereafter, when a processing system of the entity receives present media information, some or all the present media information may be provided to the quantum optimizer. The quantum optimizer then analyzes the information using the previously determined model to identify indications of potential pricing movement, and thereby, indicating a trade. By employing a quantum optimizer in this manner, the present invention is able to analyze present media information in real-time (e.g., within a few seconds of receiving present media information).

More specifically, in some embodiments of the system, operational intelligence that identifies prominent variables within a prior time frame and correlates the time frame with a pricing movement that has occurred. Such correlation may be built into a model based on both near past and present media information and/or trends tending to indicate near future or future potential pricing movements. Thus, when near past and/or present variables correlate to variables present in the former time frame, an indication of potential pricing movement may be determined. The system may generate knowledge artifacts by parsing of past media information such as reports, social media and other media sourced from companies, individuals and/or otherwise. The system may also identify word forms used (such as verbs, nouns and otherwise) that may trigger potential pricing movement. Within the model, such word forms may each correlate to a state of energy level within a quantum computer, i.e., to a qubit. The quantum computer may thereby identify potential words and/or combinations that trigger potential pricing movement, and build a model compiling each of the various triggers into a model. The model may be modified in real-time or periodically similar to an artificial intelligence engine that is "learning" as it progresses. Once indications of potential pricing movement are identified based on application of the model to present media information and/or trends, the system may transmit a trade data signal to an operator to aid in purchasing or selling a product.

Traditional computers may require a large and unwieldy set of rules that would take a long time to process, and therefore, would not support real-time application to present media information. A potential pricing movement time frames would become obsolete without quantum processing of the present media information.

In some embodiments, an "entity" as used herein may be any institution employing information technology resources and particularly technology infrastructure configured for large scale processing of media information in order to indicate potential pricing movement. As such, the entity may be any institution, group, association, financial institution, establishment, company, union, authority or the like, employing information technology resources for the processing of media information to indicate potential pricing movement.

As described herein, a "user" may be an individual associated with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer. In other embodiments, a user may be a party (e.g., an individual or organization) sending, receiving, or otherwise involved with media information analysis and indications of potential pricing movement.

FIG. 3 provides a block diagram illustrating an operating environment 300, in accordance with an embodiment of the present invention. As illustrated in FIG. 3, the operating environment 300 typically includes a user device 400, a media source device(s) 500, and a media processing system 600. The media processing system 600 is typically maintained by an entity (e.g., financial institution) that processes media information to predict future potential pricing movement. The user device 400 and/or media source device 500 may be configured to collect and/or manage media information to be analyzed by the media processing system 600. The collected media information is then transmitted (either directly or indirectly) over a network 350 to the media processing system 600 for processing. The network 350 may include a local area network (LAN), a wide area network (WAN), and/or a global area network (GAN). The network 350 may provide for wireline, wireless, or a combination of wireline and wireless communication between devices in the network. In one embodiment, the network 350 includes the Internet. In one embodiment, the network 350 includes a wireless telephone network 352. The media processing system 600 may also be in network communication with other devices, such as other entity systems 360 and/or third party systems 370, which may also process aspects of collected media information or otherwise facilitate media information model generation and/or analysis.

FIG. 4 provides a block diagram illustrating the user device 400 of FIG. 3 in more detail, in accordance with embodiments of the invention. In some embodiments, the user device 400 is a mobile device, such as mobile telephone. However, it should be understood, however, that a mobile telephone is merely illustrative of one type of mobile device that may benefit from, employ, or otherwise be involved with embodiments of the present invention and, therefore, should not be taken to limit the scope of embodiments of the present invention. Other types of mobile devices may include portable digital assistants (PDAs), pagers, mobile televisions, gaming devices, laptop computers, cameras, video recorders, audio/video player, radio, GPS devices, or any combination of the aforementioned. In addition, the user device 400 may be a computing device that is not a mobile device, such as a desktop computer.

The user device 400 typically includes a processor 410 communicably coupled to such devices as a memory 420, user output devices 436, user input devices 440, a communication interface 460, a power source 415, a clock or other timer 450, a camera 480, and a positioning system device 475. The processor 410, and other processors described herein, typically includes circuitry for implementing communication and/or logic functions of the user device 400. For example, the processor 410 may include a digital signal processor device, a microprocessor device, and various analog to digital converters, digital to analog converters, and/or other support circuits. Control and signal processing functions of the user device 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the user device 400 to transmit and receive web content, such as, for example, location-based content and/or other web page content, according to a Wireless Application Protocol (WAP), Hypertext Transfer Protocol (HTTP), and/or the like.

The processor 410 is typically configured to use the communication interface 460 to communicate with one or more other devices on the network 350. In this regard, the communication interface 460 typically includes an antenna 476 operatively coupled to a transmitter 474 and a receiver 472 (together a "transceiver"). The processor 410 is typically configured to provide signals to and receive signals from the transmitter 474 and receiver 472, respectively. The signals may include signaling information in accordance with the air interface standard of the applicable cellular system of the wireless telephone network 352. In this regard, the user device 400 may be configured to operate with one or more air interface standards, communication protocols, modulation types, and access types. By way of illustration, the user device 400 may be configured to operate in accordance with any of a number of first, second, third, and/or fourth-generation communication protocols and/or the like. For example, the user device 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 400 may also be configured to operate in accordance with non-cellular communication mechanisms, such as via a wireless local area network (WLAN) or other communication/data networks.

The communication interface 460 may also include a near field communication (NFC) interface 470. As used herein, the phrase "NFC interface" generally refers to hardware and/or software that is configured to contactlessly and/or wirelessly send and/or receive information over relatively short ranges (e.g., within four inches, within three feet, within fifteen feet, and the like). The NFC interface 470 may include a smart card, key card, proximity card, Bluetooth® device, radio frequency identification (RFID) tag and/or reader, transmitter, receiver, and/or the like. In some embodiments, the NFC interface 470 communicates information via radio, infrared (IR), and/or optical transmissions. In some embodiments, the NFC interface 470 is configured to operate as an NFC transmitter and/or as an NFC receiver (e.g., an NFC reader). Also, it will be understood that the NFC interface 470 may be embedded, built, carried, and/or otherwise supported in and/or on the user device 400. In some embodiments, the NFC interface 470 is not supported in and/or on the user device 400, but the NFC interface 470 is otherwise operatively connected to the user device 400 (e.g., where the NFC interface 470 is a peripheral device plugged into the user device 400). Other apparatuses having NFC interfaces mentioned herein may be configured similarly. In some embodiments, the NFC interface 470 of the user device 400 is configured to contactlessly and/or wirelessly communicate information to and/or from a corresponding NFC interface of another apparatus (e.g., another mobile or computing device).

The user device 400 typically has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410. The user input devices 440, which allow the user device 400 to receive data from a user, may include any of a number of devices allowing the user device 400 to receive data from a user, such as a keypad, keyboard, touch-screen, touchpad, microphone, mouse, joystick, other pointer device, button, soft key, and/or other input device(s). The user interface may also include a camera 480, such as a digital camera.

The user device 400 may also include a positioning system device 475 that is configured to be used by a positioning system to determine a location of the user device 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate location of the user device 400. In other embodiments, the positioning system device 475 includes a proximity sensor or transmitter, such as an RFID tag, that can sense or be sensed by devices known to be located proximate a location to determine that the user device 400 is located proximate these known devices.

The user device 400 further includes a power source 415, such as a battery, for powering various circuits and other devices that are used to operate the user device 400. Embodiments of the user device 400 may also include a clock or other timer 450 configured to determine and, in some cases, communicate actual or relative time to the processor 410 or one or more other devices.

The user device 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which include computer-executable instructions/code executed by the processor 410 to implement the functions of the user device 400 described herein. For example, the memory 420 may include such applications as a conventional web browser application 422 and/or a mobile banking application 421. These applications also typically provide a graphical user interface (GUI) on the display 430 that allows the user to communicate with the user device 400, the media processing system 600, and/or other devices or systems. In one embodiment of the invention, when the user decides to enroll in an online banking program, the user downloads or otherwise obtains the mobile banking system client application from an entity system (e.g., an application server). In other embodiments of the invention, the user interacts with the media processing system 600 via the web browser application 422 in addition to, or instead of, the mobile banking application 421. The user of the user device 400 may use the web browser application 422 and/or the mobile banking application 421 to administer one or more of the processes discussed herein such as managing which media information will be collected and sent to the media processing system 600 and/or setting one or more threshold levels for making determinations such as whether a trade should be indicated.

The memory 420 can also store any of a number of pieces of information, and data, used by the user device 400 and the applications and devices that make up the user device 400 or are in communication with the user device 400 to implement the functions of the user device 400 and/or the other systems described herein. For example, the memory 420 may include such data as user authentication information.

The media source device 500 is typically a network device, such as a device within any network in which potentially relevant media data is processed and/or passes through. Referring now to FIG. 5, the media source device 500 includes various features, such as a network communication interface 510, a processing device 520, a user interface 530, and a memory device 550. The network communication interface 510 includes a device that allows the media source device 500 to communicate over the network 350 (shown in FIG. 3). In one embodiment of the invention, a media application 555 may communicate with other devices and/or applications discussed herein in order to capture, store and/or communicate metadata or information related to data processing and/or communication performed by the media source device 500. The media source device 500 may interact with various other devices/system to facilitate collection of media information, as discussed herein.

As used herein, a "processing device," such as the processing device 520, generally refers to a device or combination of devices having circuitry used for implementing the communication and/or logic functions of a particular system. For example, a processing device 520 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 520 may further include functionality to operate one or more software programs based on computer-executable program code thereof, which may be stored in a memory. As the phrase is used herein, a processing device 520 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" 530 generally includes a plurality of interface devices and/or software that allow a user to input commands and data to direct the processing device to execute instructions. For example, the user interface 530 presented in FIG. 5 may include a graphical user interface (GUI) or an interface to input computer-executable instructions that direct the processing device 520 to carry out specific functions. The user interface 530 employs certain input and output devices to input data received from the customer or output data to the customer. These input and output devices may include a display, mouse, keyboard, button, touchpad, touch screen, microphone, speaker, LED, light, joystick, switch, buzzer, bell, and/or other customer input/output device for communicating with one or more users.

As used herein, a "memory device" 550 generally refers to a device or combination of devices that store one or more forms of computer-readable media for storing data and/or computer-executable program code/instructions. Computer-readable media is defined in greater detail below. For example, in one embodiment, the memory device 550 includes any computer memory that provides an actual or virtual space to temporarily or permanently store data and/or commands provided to the processing device 520 when it carries out its functions described herein.

In some embodiments, the media source device 500 may include a contactless interface. In one embodiment, the contactless interface is an NFC interface. The contactless interface may be configured to contactlessly and/or wirelessly send and/or receive information over relatively short ranges (e.g., within four inches, within three feet, etc.). The contactless interface may include a transmitter, receiver, smart card, key card, proximity card, Bluetooth® device, radio frequency identification (RFID) tag and/or reader, and/or the like. In some embodiments, the contactless interface communicates information via radio, IR, and/or optical transmissions. Generally, the contactless interface is configured to operate as a contactless transmitter and/or as a contactless receiver. The contactless interface functions to facilitate information transactions with users utilizing an external apparatus, for example, the user device 400, capable of contactless communication. Also, it will be understood that the contactless interface may be embedded, built, carried, and/or otherwise supported in and/or on the media source device 500. In some embodiments, the contactless interface is not supported in and/or on the media source device 500, but is otherwise operatively connected to the media source device 500 (e.g., where the contactless interface is a peripheral device plugged into the media device 500). The contactless interface of the media source device 500 may be configured to contactlessly and/or wirelessly communicate information to and/or from an external apparatus (e.g., the user device 400).

The media source device 500, may further include one or more additional devices to help execute one or more of the steps and/or processes discussed herein. In some embodiments the media source device 500 are configured to authenticate data transmissions from originating network devices by establishing an operative communication channel with the media processing apparatus 610. For instance, the media source device 500 may transmit signal(s) with encoded data specific to the media processing apparatus 610 that other devices cannot recognize and/or decode. The media processing apparatus 610 may receive the encoded data and a specific decoding module of the media processing apparatus 610 may decode the signal and transmit an augmented signal to a receiver on the media source device(s) 500. The augmented signal may include the decoded signal along with a token identifier of the media processing apparatus 610, one or more user parameters (such as authentication credentials, or indication of a successful validation of credentials received at the media processing apparatus 610, such as the user's fingerprint or passcode) and the like. The media source device(s) 500 (optionally in conjunction with another system), may then analyze the augmented signal and authenticate the data transmission based on authenticating the media processing apparatus 610, and allow the transmission to proceed.

FIG. 6 depicts the media processing system 600 in more detail. The media processing system 600 typically includes a media processing apparatus 610. The media processing apparatus 610 is typically a device that functions as a processing center for one or more of the steps and/or processes discussed herein. For example, the media processing apparatus 610 may be or include a classical computer having a network communication interface 630, a processing device 650, and a memory device 650. The media processing apparatus 610 also typically includes a media application 655 that is configured to perform various aspects of processing a media information to determine a potential pricing movement, as discussed herein. In order to facilitate real-time analysis of present media information, the media processing apparatus 610 is typically in communication with a quantum optimizer 670. The quantum optimizer is typically configured to perform various aspects of generating a model and analyzing present media information as described herein. An exemplary quantum optimizer is depicted in more detail in FIG. 1.

Referring now to FIGS. 7A-7B, a method 700 is provided for analyzing media information in real-time to identify potential product pricing movement. Some or all the steps of method 700 may be performed by the media processing system 600.

Initially, at block 701, the media processing apparatus 610, which as previously noted is typically a classical computer (e.g., a binary, digital electronic computer), identifies historical media information from one or more media source device(s). At block 702, the media processing apparatus 610 identifies historical product ratings movement information related to instances of confirmed product ratings movement (e.g., security pricing movement). This information is typically retrieved or received from one or more media source devices(s), such as one or more network devices, webservers, or the like. This information may or may not include information indicating whether these previous product ratings movements were correlated to one or more circumstances (e.g., current events) and, therefore, correlated to one or more keywords related to those circumstances. In addition, other information that may correlate with whether or not the ratings movements were correlated to circumstances, such as words, tone or advertisement, messaging and other public information distributed by relevant entities, such as an entity tied directly or indirectly to the ratings, may also be identified. At block 703, the media processing apparatus 610 transmits the identified information to the quantum optimizer 670. In some embodiments, the media processing apparatus 610 may format the media information for optimization by the quantum optimizer 670 before transmitting the media information to the quantum optimizer 670.

At block 704, the quantum optimizer 670 receives the information from the media processing apparatus 610.

Next, at block 705, the quantum optimizer 670 analyzes the historical media information and historical product ratings movement information to generate a first model for analyzing present media information. In particular, the quantum optimizer 670 performs adiabatic quantum computation and/or quantum annealing using the information to generate an optimal model that may be used to determine whether a particular piece or combined pieces of media information should indicate a potential product rating movement such that a trade should be considered.

Accordingly, this model may subsequently be used by the quantum optimizer 670 to determine whether a particular piece or pieces of present media information or trending media information should indicate a trade. In some embodiments, this model generated by the quantum optimizer 670 is a model that may be evaluated by a quantum computer (e.g., the quantum optimizer 670), but not by a classical computer.

In some embodiments, as illustrated by blocks 706 and 707, the quantum optimizer 670 uses the model to determine one or more indicative attributes of future media information (perhaps related to future circumstances(s)) that may be indicative of future product ratings movements. Then, the quantum optimizer may transmit the indicative attributes and/or the model to the classical computer apparatus for application of the attributes or model to present media information and/or present media information trends.

At block 708, the media processing apparatus 610 may receive the indicative attributes (and/or the model) from the quantum optimizer. At block 709, the media processing apparatus 610 may receive or retrieve, from one or more media source devices present attributes related to present media information. For example, in some embodiments, the media processing apparatus 610 may receive a set of present media information and filter the media information to isolate a number of keywords from the media. In some embodiments, this "pre-analysis" step or steps may, on the other hand, be performed by the quantum optimizer. Once a number of keywords are isolated from the media, they may be sent to the quantum optimizer for analysis by application of the model to the keywords.7

In some embodiments, as shown in block 710, the quantum optimizer 670 compares the indicative attributes (and/or the model itself) may be used to identify potential product ratings movement. Then, the quantum optimizer 670 may apply one or more thresholds to the indication to determine whether a trade instruction should be sent. Finally, in some embodiments, the quantum optimizer 670 transmits a command configured to indicate a trade should be made or that the trade opportunity should be allowed to pass without action, as represented by block 712.

In other embodiments, the quantum optimizer applies the model and/or the indicative attributes to the present attributes to determine whether the media should be verified or mitigated. This may be done by the media processing apparatus 610 transmitting the present attributes to the quantum optimizer for processing, including comparing the present attributes to the indicative attributes and/or applying the present attributes to the model. In some embodiments, the media processing apparatus 610 may first format the present attributes for optimization by the quantum optimizer 670 before transmitting the present attributes to the quantum optimizer 670.

In some embodiments, the quantum optimizer 670 analyzes the present attributes using the model to determine whether to indicate a trade. Based on this analysis, the quantum optimizer 670 transmits to the media processing apparatus 610 an indication of the trade or to allow the opportunity to pass. In such a case, the media processing apparatus 610 receives from the quantum optimizer 670 the indication of the trade. Based on the indication of the trade, the media processing apparatus 610 may allow the trade opportunity to pass without taking any action. If the trade is indicated, then the media processing apparatus 610 may approve the trade indication and transmit trade instructions to another device or devices for completing the trade. In some embodiments, however, no affirmative action is taken. If the trade is not indicated, then in some embodiments, the media processing apparatus 610 may flag the product ratings and related media information for further analysis (e.g., by an analyst employed by the entity).

In some embodiments, the quantum optimizer 670 is configured to update the model based on information received regarding subsequent ratings movements and correlated circumstances and media information.

In some instances, while it is desirable to analyze media information in real-time, it may also be desirable to minimize usage of the quantum optimizer 670 (e.g., due to cost of use, availability, demand by other systems to use the quantum optimizer 670, and the like. Accordingly, the quantum optimizer 670 may also be configured to analyze the media information to generate a second model for analyzing media information to indicate trades. Unlike the first model described above, the second model is typically configured for real-time processing by a classical computer (e.g., by the media processing apparatus 610). Because the second model is typically configured for near real-time processing by a classical computer (e.g., processing within a few seconds or less), the second model is typically less complex and less precise than the first model. The second model is also typically configured to provide both an indication of whether a trade should be indicated as well as a confidence level regarding the trade indication. For example, when a relatively high number of media sources indicate information correlating to a potential ratings movement, then the confidence of the ratings movement may be higher, but alternatively, when a relatively low number of media sources indicate information correlating to a potential ratings movement, then the confidence of the ratings movement may be lower.

When the confidence level is relatively high, the second model is expected to be sufficiently precise regarding whether a particular trade should be made. However, when the confidence level is not high, the indication provided by the second model of whether a particular trade should be made is likely unreliable.

Once the second model has been created by the quantum optimizer 670 (e.g., at the same time the first model is created), the second model is typically provided to the media processing apparatus 610. Thereafter, when the media processing apparatus 610 receives media information, the media processing apparatus 610 initially analyzes the media information using the second model. If the confidence level provided by the second model is relatively high (e.g. by comparing the confidence level to a defined threshold), then the media processing apparatus 610 determines that a trade indication should be made. However, if the confidence level provided by the second model is not high, then the media processing apparatus 610 transmits the media information (and/or any filtered information such as keywords corresponding to the media information) to the quantum optimizer 670 as previously described. By initially analyzing the media information using the second model (which may be processed in real-time by a classical computer), and then evaluating the media information using the first model (which may be processed in real-time by a quantum optimizer) if the confidence level provided by the second model is not high, media information (and thereby particular circumstances) may be verified in real-time, while minimizing the usage of the quantum optimizer.

As evident from the preceding description, the system described herein represents an improvement in technology by analyzing media information (e.g., that correlates to current events and/or entity publications) using a quantum optimizer in order to provide a real-time determination of whether to indicate a trade. Moreover, by initially evaluating media information using a model that may be processed in real-time or near real-time by a classical computer, and then evaluating certain media information using a model that may be processed in real-time by a quantum optimizer if the confidence level provided by the classical-computer model is not high, analyzing media information for trade indications may be performed in real-time, while minimizing the usage of the quantum optimizer.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A computer system for managing a multi-disciplinary comprehensive real-time trading signal within a designated time frame, comprising:
    a classical computer apparatus comprising:
        a processor;
        a memory; and
        a media application that is stored in the memory and executable by the processor;
    a quantum optimizer in operative communication with the classical computer apparatus, the quantum optimizer comprising:
    a quantum processor; and
    a quantum memory;
    wherein the media application is configured for:
        transmitting historical media information and historical product information associated with a product to the quantum optimizer;
    wherein the quantum optimizer is configured for:
        receiving the historical media information and historical product information; and
        analyzing the historical media information and historical product information to determine one or more indicative attributes that are indicative of product pricing movement,
    wherein the media application is further configured for:
        establishing an operative communication channel with one or more media sources by:
            receiving a signal from each of the one or media sources, wherein the signal comprises encoded data specific to the classical computing apparatus;
            implementing a decoding module to decode the encoded data;
            in response to decoding, transmitting an augmented signal to each of the one or more media sources that includes the decoded data, a token identifier associated with the classical computing apparatus and one or more user authentication credentials;
        receiving, from the one or more media sources via the operative communication channel, present media information associated with the product;
        identifying present attributes in the present media information;
        determining, based on the present media information, that a confidence level in indicating a product pricing movement is below a predetermined threshold confidence level;
        in response to determining that the confidence level is above the predetermined threshold confidence level, providing an indication that a trade of the product is advisable and transmitting a command configured to cause a trade of the product;

in response to determining that the confidence level is below the predetermined threshold confidence level, transmitting the present attributes to the quantum optimizer, wherein the quantum optimizer is further configured for:

receiving the present attributes;

comparing the present attributes to the indicative attributes to determine a potential product pricing movement.

2. The computer system of claim 1, wherein:

the quantum optimizer is further configured for:

transmitting the indicative attributes to the classical computer apparatus for comparison to the present attributes of the present media information for identification of potential product pricing movement.

3. The computer system of claim 2, wherein:

the media application is further configured for:

receiving the indicative attributes from the quantum optimizer; and comparing the indicative attributes to the present attributes to determine a determined potential product pricing movement.

4. The computer system of claim 3, wherein:

the media application is further configured for:

transmitting the command configured to cause the trade of the product corresponding to the determined potential product pricing movement.

5. The computer system of claim 4, wherein:

the media application is further configured for:

transmitting the command configured to purchase an amount of the product.

6. The computer system of claim 4, wherein:

the media application is further configured for:

transmitting the command configured to sell an amount of the product.

7. The computer system of claim 2, wherein:

the media application is further configured for:

comparing the indicative attributes to the present attributes to identify potential product pricing movement.

8. The computer system of claim 1, wherein:

the quantum optimizer is configured for:

determining one or more models for identification of potential product pricing movements based on application of the one or more models to present media information.

9. The computer system of claim 8, wherein:

the quantum optimizer is further configured for:

using the one or more models to determine the indicative attributes.

10. The computer system of claim 8, wherein:

the quantum optimizer is further configured for:

transmitting the one or more models to the classical computer apparatus;

wherein the media application is further configured for:

receiving the one or more models from the quantum optimizer; and inputting the present attributes into the one or more models to identify potential product pricing movement.

11. The computer system of claim 1, wherein:

the media application is further configured for:

receiving the determined potential product pricing movement; and transmitting a command configured to cause a product trade corresponding to the determined potential product pricing movement.

12. The computer system of claim 1, wherein:

the quantum computer is further configured for:

analyzing the historical media information and historical product information to generate a model for identification of potential product pricing movements, wherein the model is configured for real-time processing by the classical computer apparatus;

wherein the media application is further configured for:

analyzing the present attributes using the model to determine (i) whether the media indicates a potential product pricing movement, (ii) a level of potential product pricing movement, and (iii) the confidence level; and based on analyzing the present attributes using the model to determine (i) whether the media indicates a potential product pricing movement, (ii) a level of potential product pricing movement, and (iii) a confidence corresponding to the level of potential product pricing movement, determining a significant product pricing movement is unlikely and thereby allowing an opportunity for trade to pass.

13. The computer system of claim 1, wherein:

the quantum computer is further configured for:

analyzing the historical media information and historical product information to generate a first model for identification of potential product pricing movements, wherein the first model is configured for real-time processing by the classical computer apparatus;

analyzing the historical media information and historical product information to generate a second model for identification of potential product pricing movements, wherein the second model is configured for real-time processing by the quantum computer; and transmitting the first model to the classical computer apparatus;

wherein the media processing application is further configured for:

analyzing the present attributes using the first model to determine (i) whether the present media information indicates the potential product pricing movement, (ii) a level of potential product pricing movement, and (iii) the confidence level of the potential product pricing movement; and based on analyzing the present attributes using the model to determine (i) whether the present media information indicates the potential product pricing movement, (ii) level of the potential product pricing movement, determining a significant product pricing movement is unlikely and thereby allowing an opportunity for trade to pass, determining that a quantum computing analysis is necessary to achieve a threshold level of potential product pricing movement is significant; and in response, transmitting the present attributes to the quantum computer for analysis.

14. The computer system of claim 13, wherein:

the quantum computer is further configured for:

analyzing the present attributes using the second model to determine (i) whether the media indicates a potential product pricing movement, (ii) a level of potential product pricing movement, and (iii) a confidence corresponding to the level of potential product pricing movement; and based on analyzing the present attributes using the model to determine (i) whether the media indicates a potential product pricing movement, (ii) a level of potential product pricing movement, and (iii) a confidence corresponding to the level of potential product pricing movement, transmitting to the classical computer apparatus an indication configured to cause the trade or not to cause the trade.

15. The computer system of claim 14, wherein:
the media application is further configured for:
- receiving the indication configured to cause the classical computer apparatus to make the trade;
- and in response to receiving the indication, transmitting a command configured to cause the trade.

16. The computer system of claim 14, wherein:
the media application is further configured for:
- receiving the indication configured to cause the classical computer apparatus not to make the trade;
- and in response to receiving the indication, allowing an opportunity to make the trade to pass.

* * * * *